US009490928B2

(12) United States Patent
Ye et al.

(10) Patent No.: US 9,490,928 B2
(45) Date of Patent: Nov. 8, 2016

(54) ARRAYED WAVEGUIDE GRATING BASED MODULAR INTERCONNECTION NETWORKS AND METHODS FOR CONSTRUCTING AND APPLYING THE SAME

(71) Applicant: Shanghai Jiao Tong University, Shanghai (CN)

(72) Inventors: Tong Ye, Shanghai (CN); Tony T. Lee, Shanghai (CN); Weisheng Hu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 14/557,429

(22) Filed: Dec. 1, 2014

(65) Prior Publication Data

US 2016/0056911 A1 Feb. 25, 2016

(30) Foreign Application Priority Data

Aug. 20, 2014 (CN) .......................... 2014 1 0410122

(51) Int. Cl.
*H04J 14/02* (2006.01)
*H04Q 11/00* (2006.01)
*H04L 12/931* (2013.01)

(52) U.S. Cl.
CPC .......... *H04J 14/0279* (2013.01); *H04L 49/00* (2013.01); *H04Q 2011/0016* (2013.01); *H04Q 2011/0032* (2013.01)

(58) Field of Classification Search
CPC ................ H04J 14/02; H04J 14/0284; H04J 14/0278–14/0279; H04Q 2011/0032; H04Q 2011/0016
See application file for complete search history.

(56) References Cited

U.S. PATENT DOCUMENTS

| 2006/0153496 A1* | 7/2006 | Tanobe | ............... | H04J 14/0227 385/24 |
| 2009/0324243 A1* | 12/2009 | Neilson | ............... | H04Q 11/0005 398/154 |

OTHER PUBLICATIONS

Kishore Ramachandran et al., "60 GHz Data-Center Networking: Wireless => Worry Less?" NEC Laboratories America, Princeton, NJ, pp. 1-11 (Jul. 14, 2008).

*Primary Examiner* — David Payne
*Assistant Examiner* — Casey Kretzer
(74) *Attorney, Agent, or Firm* — Mei & Mark LLP; Manni Li

(57) ABSTRACT

An arrayed waveguide grating (AWG) based interconnection network and modular construction method, comprising $N_1$ left nodes, with each left node having $N_2$ ports, $N_2$ right nodes, with each right node having $N_1$ ports, where $N_1 \geq N_2$, $N_1$ and $N_2$ having a greatest common divisor r, and each port having an optical transceiver associated with a fixed wavelength; $N_1 n_2$ r×1 wavelength multiplexers having their input ports respectively connected with the ports of $N_1$ left nodes, where $n_2 = N_2/r$; $N_2 n_1$ 1×r wavelength demultiplexers having their output ports respectively connected with the ports of $N_2$ right nodes, where $n_1 = N_1/r$; $n_1 n_2$ r×r AWGs connecting the r×1 wavelength multiplexers and the 1×r wavelength demultiplexers r×r$n_1 n_2$, and each of the r×r AWGs being associated with a wavelength subset $\{\lambda_k | k=0, 1, \ldots, r-1\}$.

6 Claims, 14 Drawing Sheets

ARRAYED WAVEGUIDE GRATING BASED MODULAR INTERCONNECTION NETWORKS AND METHODS FOR CONSTRUCTING AND APPLYING THE SAME

CROSS-REFERENCE AND RELATED APPLICATIONS

The subject application claims priority on Chinese patent application No. CN 201410410122.8 filed on Aug. 20, 2014. The contents and subject matter of the Chinese priority application is incorporated herein by reference.

FIELD OF TECHNOLOGY

The present invention relates to large-scale networking of a data center, and in particular, relates to an arrayed waveguide grating (AWG) based modular interconnection network and methods for constructing and applying the same.

BACKGROUND OF THE INVENTION

In the past decade, fast global information development push data centers to evolve along the direction of super large scale. In 2012, each data center of Amazon has about 60,000 servers, and that for Google, the number exceeds 50,000 servers, while Microsoft is building a data center containing over 300,000 servers. Current data centers generally adopt the layered tree topology, such as the 'Fat Tree' topology. The advantage of the tree topology is its large bi-directional bandwidth, while the disadvantage is its lack of scalability. As pointed out in the Article entitled "60 GHz Data-Center Networking: Wireless ⇒ Worry less," topological and cabling complexity in data centers is reaching unimaginable proportions, leading to maintenance challenges, inefficient cooling, and substantial operational costs.

To tackle the interconnecting issue, the following proposals have been put forth in the industry:

The first is to replace wires with wireless interconnects. Wireless networking has signals prone to interference, small bandwidth, and high consumption of stations, making it only a topic at the academies, and not fit for practical application.

The second is to develop a unified structure based on integrated and enhanced Ethernets, with Cisco and Brocade being the major proponents. Although the method decreases the number of cables, trunk adapters, and network interfaces, the cost of equipping and integrating network adapters is huge, further, main boards for Ethernet optical fiber channels are not yet available.

The third is to adopt structured cabling. The main idea is to divide the cabling system in a data center into a main cabling area and a device area based on different devices. The main cabling area and the device area are connected with optical cables, while servers, switchers, and storage devices are jumper-connected via cable distribution frames in the main cabling area and the device area. The proposed solution simplifies cable management to some extent, making it possible to move or modify the system by merely changing jumpers. But it does not decrease the number of system cables, thus interconnecting complexity remains and the operating difficulty is still high.

Because of the above reasons, a method of module networking based on Arrayed Waveguide Grating (AWG) and directed at cabling complexity and management in a data center is in need.

SUMMARY OF THE INVENTION

The present invention solves the problem of the cabling complexity and related management issues by providing a design method of AWG-based modular interconnection networks to reduce cabling complexity so as to simplify networking maintenance and management.

The present invention provides an AWG-based modular interconnection network comprising left nodes, the number of the left nodes being $N_1$, with each left node having $N_2$ ports; right nodes, the number of the right nodes being $N_2$, with each right node having $N_1$ ports; $N_1$ and $N_2$ each representing a positive integer, $N_1 \geq N_2$, and $N_1$ and $N_2$ having a greatest common divisor r, and each port having an optical transceiver associated with a fixed wavelength, characterized in that it further comprises:

$N_2 \times 1$ wavelength multiplexers, the number of the $N_2 \times 1$ wavelength multiplexers being $N_1$, with each of the $N_2 \times 1$ wavelength multiplexers having $N_2$ input ports being respectively connected with the $N_2$ ports of each of the left nodes;

$1 \times N_1$ wavelength demultiplexers, the number of the $1 \times N_1$ wavelength demultiplexers being $N_2$, with each of the $1 \times N_1$ wavelength demultiplexers having $N_1$ output ports respectively connected with the $N_1$ ports of each of the right nodes; and an $N_1 \times N_2$ AWG connecting the $N_2 \times 1$ wavelength multiplexers and the $1 \times N_1$ wavelength demultiplexers, the $N_1 \times N_2$ AWG having $N_1$ input ports and $N_2$ output ports, and being associated with a wavelength set $\Lambda = \{\lambda_0, \lambda_1, \ldots, \lambda_{N_1-1}\}$.

The present invention further provides an AWG-based modular interconnection network, comprising left nodes, the number of the left nodes being $N_1$, with each of the left nodes having $N_2$ ports, right nodes, the number of the right nodes being $N_2$, with each of the right nodes having $N_1$ ports; $N_1$ and $N_2$ are integers, $N_1 \geq N_2$, $N_1$ and $N_2$ having the greatest common divisor r, and each port having an optical transceiver associated with a fixed wavelength, characterized in that it further comprises:

$r \times 1$ wavelength multiplexers, the number of the $r \times 1$ wavelength multiplexers being $N_1 n_2$ ($N_1 n_2$ stands for the product of $N_1$ and $n_2$, and same goes for the same styled numbers in the subject application), and $n_2$ $r \times 1$ wavelength multiplexers having their input ports respectively connected with the $N_2$ ports of one of the left nodes, where $n_2 = N_2/r$;

$1 \times r$ wavelength demultiplexers, the number of the $1 \times r$ wavelength demultiplexers being $N_2 n_1$, and $n_1$ $1 \times r$ wavelength demultiplexers having output ports respectively connected with the $N_1$ ports of one of the right nodes, where $n_1 = N_1/r$; and $r \times r$ AWGs connecting the $r \times 1$ wavelength multiplexers and the $1 \times r$ wavelength demultiplexers, the number of the $r \times r$ AWGs being $n_1 n_2$, and each of the $r \times r$ AWGs being associated with a wavelength subset $\{\lambda_k | k=0, 1, \ldots, r-1\}$.

The present invention also provides an AWG-based modular interconnection network, comprising left nodes, the number of the left nodes being $N_1$, with each of the left nodes having $N_2$ ports; right nodes, the number of the right nodes being $N_2$ with each of the right node having $N_1$ ports; $N_1$, $N_2$, and K are integers, where $N_1 = KN_2$; and each port having an optical transceiver associated with a fixed wavelength, characterized in that it further comprises:

$N_2 \times 1$ wavelength multiplexers, the number of the $N_2 \times 1$ wavelength multiplexers being $N_1$, each of the $N_2 \times 1$ wavelength multiplexers having $N_2$ input ports respectively connected with the $N_2$ ports of each of the left nodes;

$1 \times N_2$ wavelength demultiplexers, the number of the $1 \times N_2$ wavelength demultiplexers being $KN_2$, the K $1 \times N_2$ wavelength demultiplexers having their output ports respectively connected with the $N_1$ ports of one of the right nodes; and $N_2 \times N_2$ AWGs connecting the $N_2 \times 1$ wavelength multiplexers and the $1 \times N_2$ wavelength demultiplexers, the number of the $N_2 \times N_2$ AWGs being K, each of the $N_2 \times N_2$ AWGs being associated with a wavelength subset $\{\lambda_k | k=0, 1, \ldots, N_2-1\}$.

The present invention further provides a method for constructing an AWG-based modular interconnection network having $N_1$ left nodes, with each left node having $N_2$ ports; the $N_2$ right nodes, with each right node having $N_1$ ports; $N_1 \geq N_2$, $N_1$ and $N_2$ being integers having a greatest common divisor r; and each port having an optical transceiver associated with a fixed wavelength, characterized in that the method comprises the following steps:

Step 1: providing $N_1$ $N_2 \times 1$ wavelength multiplexers, labeled by $L_0, L_1, \ldots, L_{N_1-1}$, for the $N_1$ left nodes, the ith $N_2 \times 1$ wavelength multiplexer having its jth input port connected with the jth port of the ith left node, and the jth port of the ith left node is associated with wavelength $$\lambda_{[i+j]N_1},$$

where $i=0, 1, \ldots, N_1-1, j=0, 1, \ldots, N_2-1$;

Step 2: providing $N_2$ $1 \times N_1$ wavelength demultiplexers labeled by $R_0, R_1, \ldots, R_{N_2-1}$, for $N_2$ right nodes, the jth $1 \times N_1$ wavelength demultiplexer having its ith output port connected separately with the ith port of the jth right node, and the ith port of the jth right node is associated with wavelength $$\lambda_{[i+j]N_1};$$

Step 3: interconnecting the $N_1$ wavelength multiplexers on the left with the $N_2$ wavelength demultiplexers on the right via an $N_1 \times N_2$ AWG, the $N_1 \times N_2$ AWG having $N_1$ input ports and $N_2$ output ports, and being associated with a wavelength set $\Lambda = \{\lambda_0, \lambda_1, \ldots, \lambda_{N_1-1}\}$.

The method further comprises:

Step 4: substituting the $N_1 \times N_2$ AWG with a three-stage AWG network $S_A(n_1, r_1, m_A, n_2, r_2)$, the AWG network $S_A$ comprising $N_1 = r_1 n_1$ input ports on its input side, with each input port being a $1 \times n_2$ wavelength demultiplexer, and $N_2 = r_2 n_2$ output ports on its output side, with each output port being an $n_1 \times 1$ wavelength multiplexer, $m_A$ $r_1 \times r_2$ AWGs in the central stage, where $r_1 = r_2 = r$, $n_1 = N_1/r$, $n_2 = N_2/r$, and $m_A = n_1 n_2$;

In the AWG network $S_A$, the ith input port is labeled by $D_{A1}(\alpha_A, a_A)$, where $\alpha_A = \lfloor i/n_1 \rfloor$ and $a_A = [i]_{n_1}$, and the jth output port is labeled by $M_{A1}(\beta_A, b_A)$, where $\beta_A = \lfloor j/n_2 \rfloor$ and $b_A = [j]_{n_2}$, and each of the AWGs in the central stage is labeled by $G_{A1}(\alpha_A, b_A)$; the $\alpha_A$th input port of $G_{A1}(\alpha_A, b_A)$ is connected with the $b_A$th output port of $D_{A1}(\alpha_A, a_A)$, the $\beta_A$th output port of $G_{A1}(\alpha_A, b_A)$ is connected with the $\alpha_A$th input port of $M_{A1}(\beta_A, b_A)$, and $G_{A1}(\alpha_A, b_A)$ is associated with a wavelength subset $\Lambda_{[\alpha_A+b_A]n_1} = \{\lambda_{[\alpha_A+b_A]n_1 r + k} | k=0, 1, \ldots, r-1\}$;

Step 5: substituting the ith $N_2 \times 1$ wavelength multiplexer $L_i$ and the $1 \times n_2$ wavelength demultiplexer $D_{A1}(\alpha_A, a_A)$ with $n_2$ $r \times 1$ wavelength multiplexers, each of which is labeled by $D_{A2}(\alpha_A, a_A, b_A)$;

substituting the jth $1 \times N_1$ wavelength demultiplexer $R_j$ and the $n_1 \times 1$ wavelength multiplexer $M_{A1}(\beta_A, b_A)$ with n $r \times 1$ wavelength demultiplexers, each of the $r \times 1$ wavelength demultiplexers being labeled by $M_{A2}(\beta_A, b_A, a_A)$;

associating each $r_1 \times r_2$ AWG, labeled by $D_{A2}(\alpha_A, b_A)$, with a wavelength subset $(\lambda_k | k=0, 1, \ldots, r-1)$;

where the output port of $D_{A2}(\alpha_A, a_A, b_A)$ is connected with the $\alpha_A$th input port of $G_{A2}(a_A, b_A)$, and the input port of $M_{A2}(\beta_A, b_A, a_A)$ is connected with the $\beta_A$th output port of $G_{A2}(\alpha_A, b_A)$.

Alternatively, the method further comprises:

Step 4: in the case of $N_1 = KN_2$, substituting the $N_1 \times N_2$ AWG with a two-stage network $S_B(K, N_2, K, 1, N_2)$, where each input port of the AWG network $S_B$ is a link, there are K $N_2 \times N_2$ AWGs in the central stage, and each output port is a $K \times 1$ wavelength multiplexer; the ith input port is labeled by $D_{B1}(\alpha_B, a_B)$, where $\alpha_B = \lfloor i/N_2 \rfloor$ and $a_B = [i]_{N_2}$, the jth output port is labeled by $M_{B1}(\gamma_B)$, where $\gamma_B = j$, and each AWG in the central stage is labeled by $G_{B1}(\alpha_B)$, and further, the AWG in the central stage is associated with a wavelength subset $\Lambda_{\alpha_B} = \{\lambda_{\alpha_B N_2 + k} | k=0, 1, \ldots, N_2-1\}$; the $a_B$th input port of $G_{B1}(\alpha_B)$ is thus $D_{B1}(\alpha_B, a_B)$, the $\gamma_B$th output port of $G_{B1}(\alpha_B)$ is connected with the $\alpha_B$th input port of $M_{B1}(\gamma_B)$;

Step 5: denoting each of the $N_1 \times 1$ wavelength multiplexers as $D_{B2}(\alpha_B, a_B)$;

Substituting the jth $1 \times N_1$ demultiplexer $R_j$ and the $K \times 1$ multiplexer $M_{B1}(\gamma_B)$ with K $N_2 \times 1$ wavelength multiplexers, each of which is labeled by $M_{B2}(\gamma_B, \alpha_B)$;

associating each $N_2 \times N_2$ AWG, labeled by $G_{B2}(\alpha_B)$, with a wavelength subset $\{\lambda_k | k=0, 1, \ldots, N_2-1\}$;

where $D_{B2}(\alpha_B, a_B)$ is connected with the $a_B$th input port of $G_{B2}(\alpha_B)$, and $M_{B2}(\gamma_B, \alpha_B)$ is connected with the $\gamma_B$th output port of $G_{B2}(\alpha_B)$.

The method further comprises:

Step 6: in the case of the dimension of the AWG in the central stage still being large, returning to Step 4, and substituting the AWG in the central stage with a module constituted of a three-stage network of small AWGs.

The present invention further provides an application of AWGs in an interconnection network. Compared with the previous works, the present invention has the following advantages:

(1) By constructing the $N_1 \times N_2$ interconnection network with the r×r AWGs, the number of the interconnection links is reduced r times.

(2) Wavelengths are reused in the AWG-based interconnection network, i.e., the r×r AWGs in the network reuses the same wavelength subset $\{\lambda_0, \ldots, \lambda_{r-1}\}$, which improves the scalability of the AWG-based interconnection system.

(3) If r is still very large, the method in Step 4 can be employed to decompose the r×r AWG into an r×r three-stage AWG network.

DETAILED DESCRIPTION OF THE INVENTION AND PREFERRED EMBODIMENTS

In combination with drawings and embodiments hereunder provided, the present invention will be further expounded. The embodiments are intended as illustrating the present invention rather than limiting its scope. Various equivalent modifications by a person skilled in the art shall fall within the scope of the claims.

Figure 1:
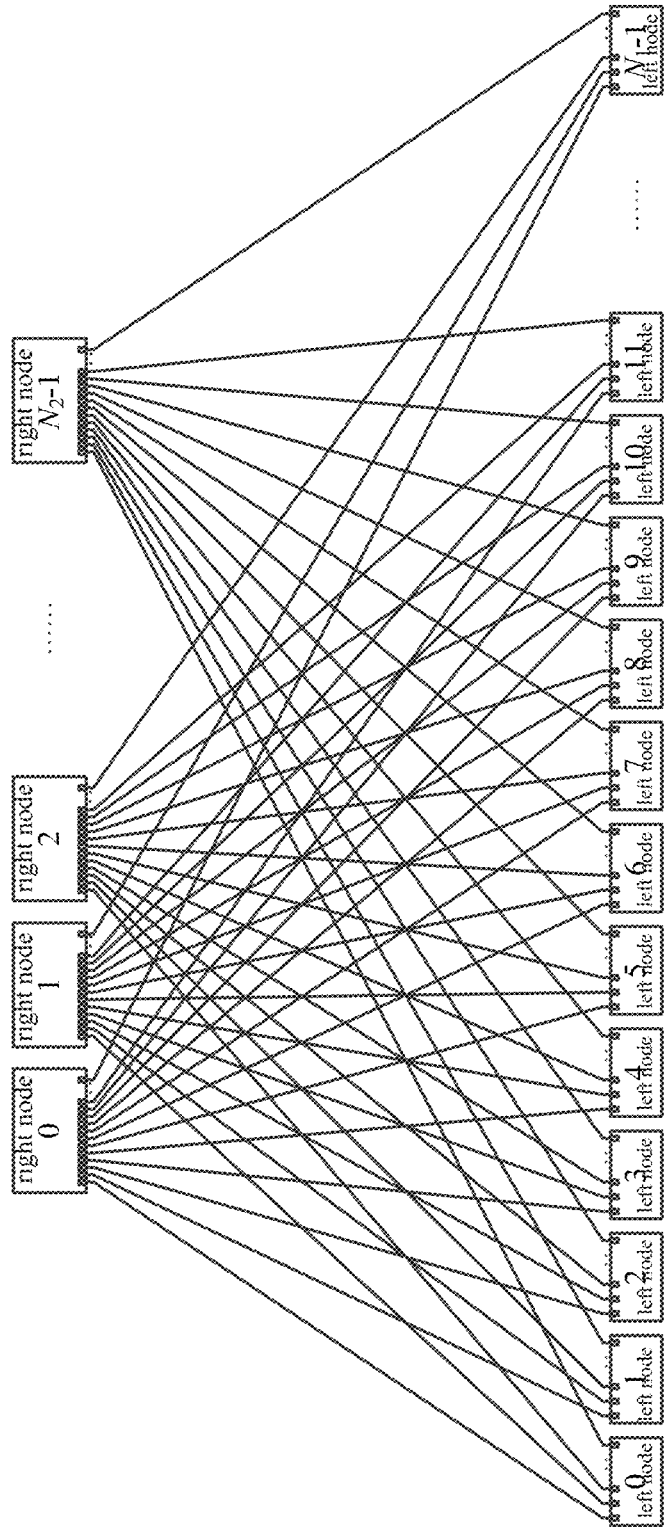
FIG. 1 shows an $N_1 \times N_2$ interconnection network $\mathcal{N}_1$ of the present invention.

An $N_1 \times N_2$ ($N_1 \geq N_2$, and $N_1$ and $N_2$ having a maximum divisor r) interconnection network $\mathcal{N}_1$ contains $N_1$ left nodes, with each node comprising $N_2$ ports, and each port having an optical transceiver; $N_2$ right nodes, with each node comprising $N_1$ ports, and each port having an optical transceiver. All the optical transceivers are associated with the same wavelength $\lambda_0$. For each of the paired left node and right node, there is one and only one link between them, and thus, there are altogether $N_1 N_2$ links in the interconnection network, as shown in FIG. 1, where the small block on each port of the node represents an optical transceiver.

Figure 2:
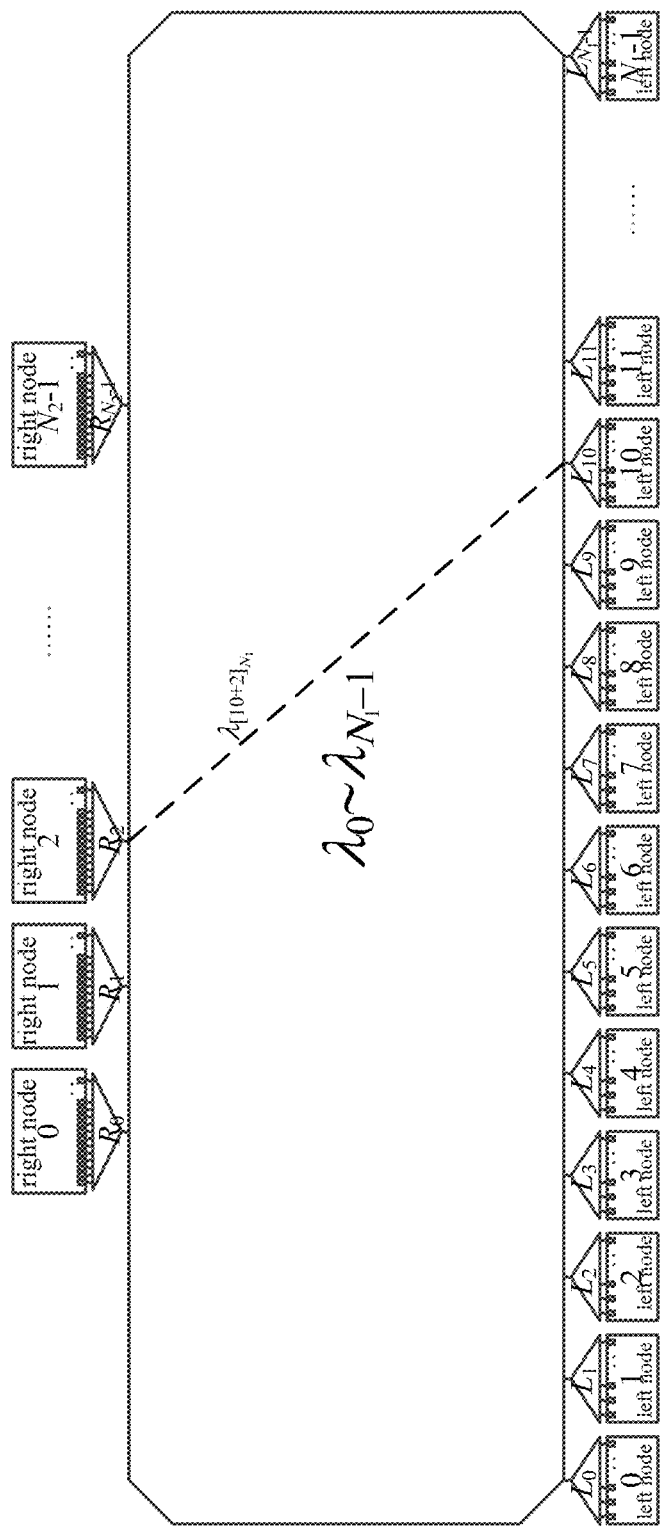
FIG. 2 shows an AWG-based $N_1 \times N_2$ interconnection network $\mathcal{N}_2$ of the present invention.
Figure 3:
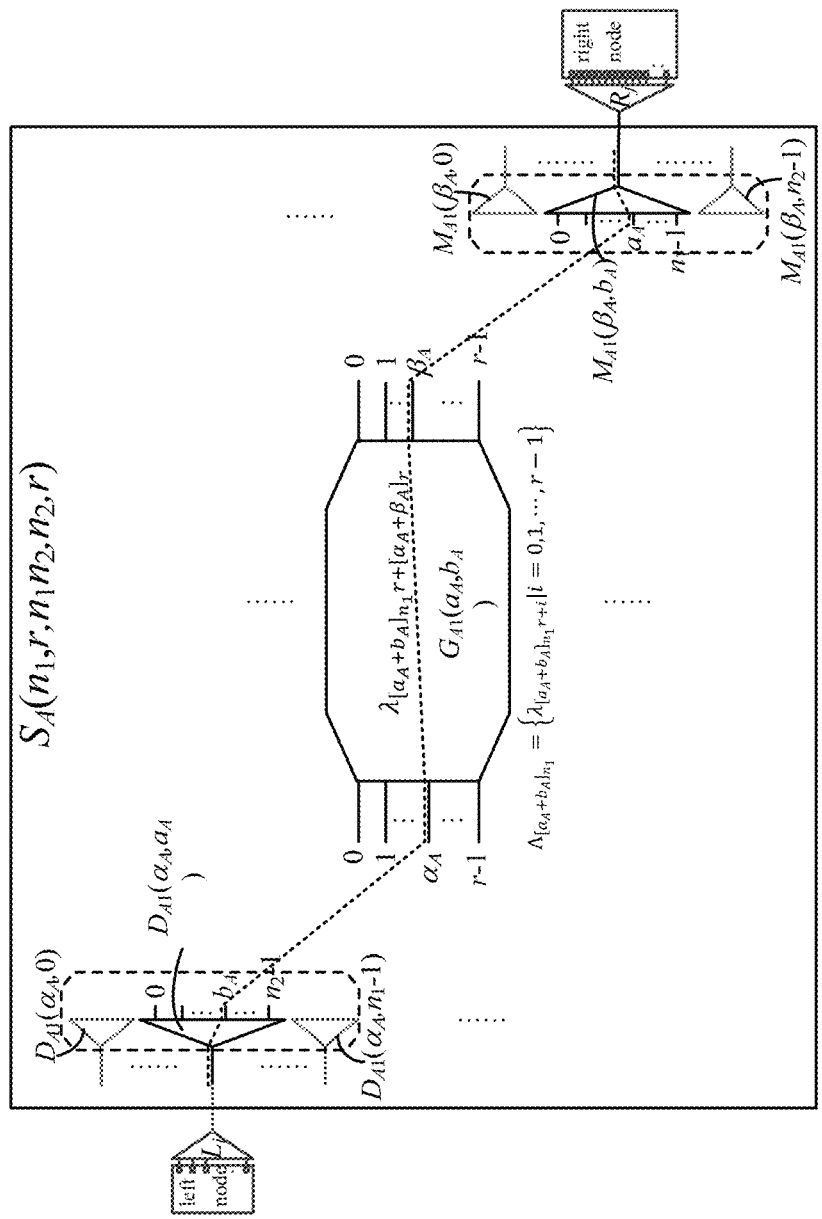
FIG. 3 shows an $N_1 \times N_2$ interconnection network $\mathcal{N}_{A1}$ comprising a three-stage AWG network $S_A$ of the present invention.
Figure 4:
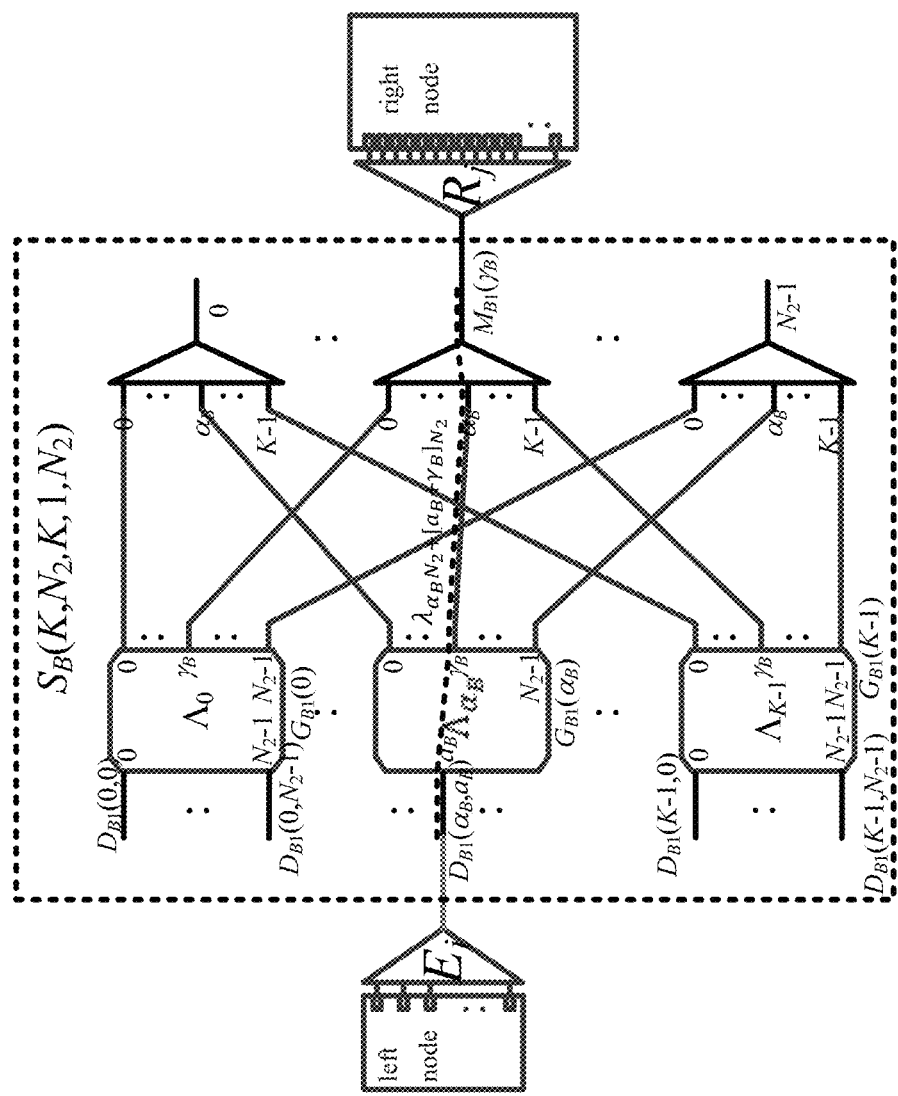
FIG. 4 shows a $KN_2 \times N_2$ interconnection network $\mathcal{N}_{B1}$ comprising a two-stage AWG network $S_B$ of the present invention.
Figure 5:
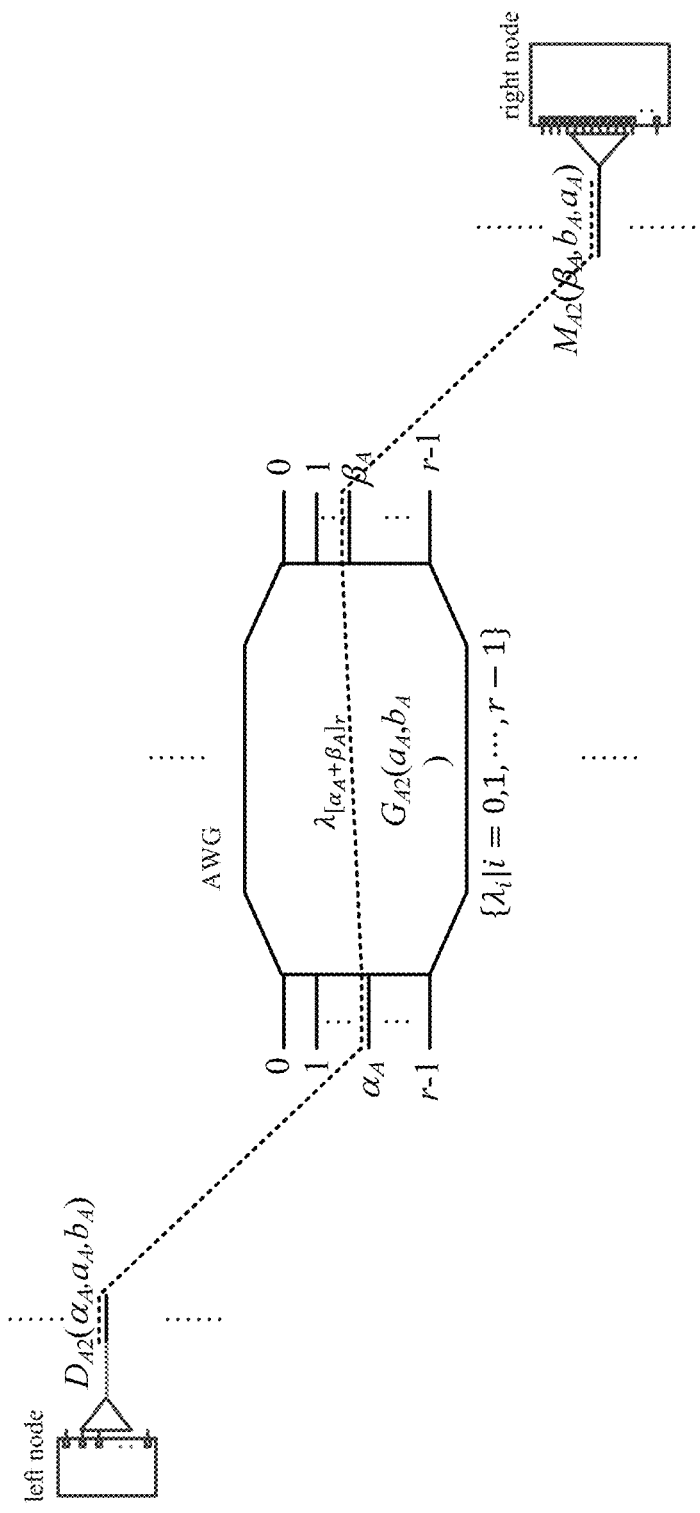
FIG. 5 shows an $N_1 \times N_2$ AWG-based modular interconnection network $\mathcal{N}_{A2}$ of the present invention.
Figure 6:
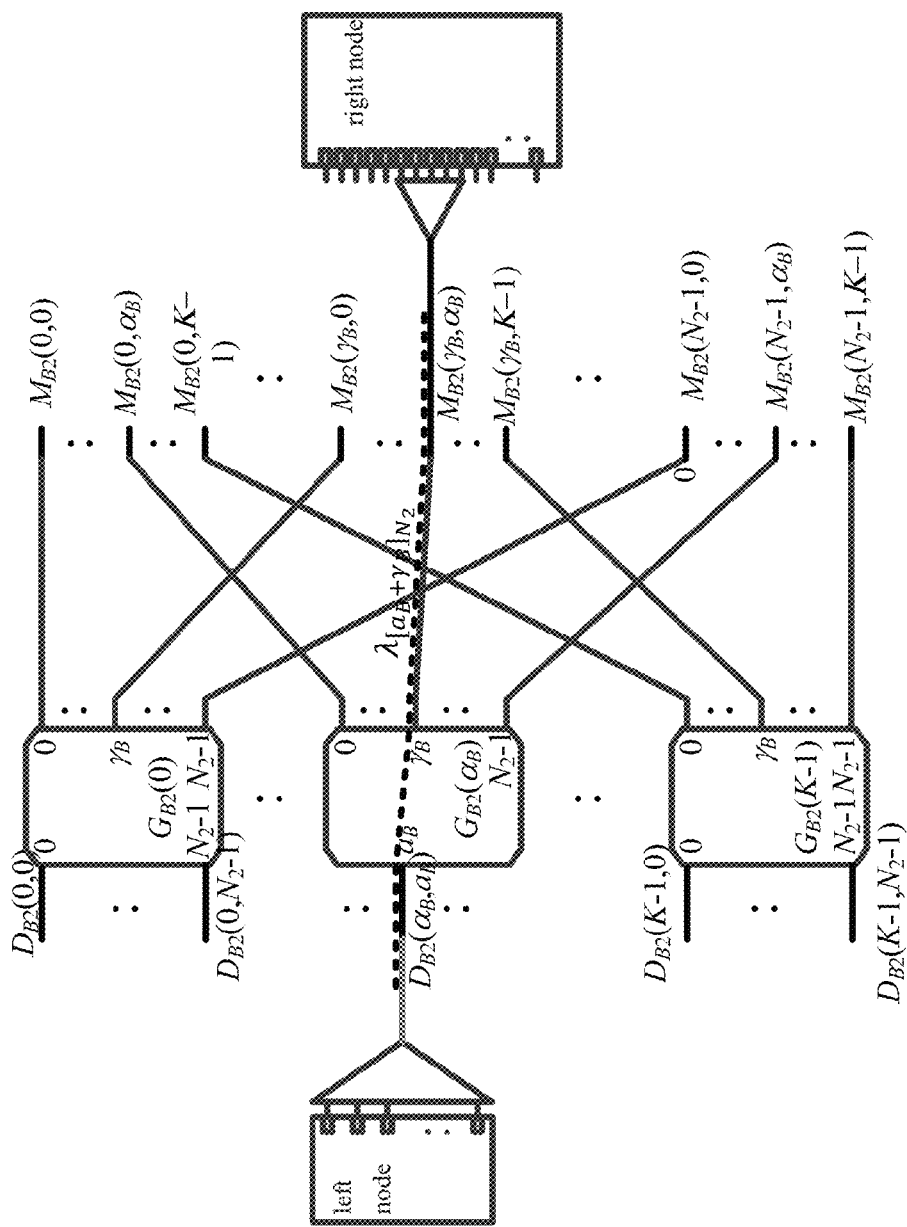
FIG. 6 shows a $KN_2 \times N_2$ AWG-based modular interconnection network $\mathcal{N}_{B2}$ of the present invention.

An AWG-based modular interconnection network for reducing the cabling complexity of a data center mainly via the wavelength division multiplexing property of AWGs, comprises the following parameters:

$N_1 \times N_2$ AWG: having $N_1$ input ports, $N_2$ output ports, and being associated with a wavelength set $\Lambda = \{\lambda_0, \lambda_1, \ldots, \lambda_{N_1-1}\}$, as shown in FIG. 2;

$N_2 \times N_2$ AWG: having $N_2$ input ports, $N_2$ output ports, and being associated with a wavelength set $\Lambda = \{\lambda_0, \lambda_1, \ldots, \lambda_{N_2-1}\}$;

$N_1 \times 1$ wavelength multiplexer/demultiplexer: $N_1 \times 1$ AWG;
$N_2 \times 1$ wavelength multiplexer/demultiplexer: $N_2 \times 1$ AWG;
$n_1 \times 1$ wavelength multiplexer/demultiplexer: $n_1 \times 1$ AWG;
$n_2 \times 1$ wavelength multiplexer/demultiplexer: $n_2 \times 1$ AWG;

$N_1 \times N_2$ AWG network $S_A(n_1, r_1, n_1, n_2, r_2)$: a three-stage AWG network, which comprises $N_1 = r_1 n_1$ input ports on the input side, each input port being a $1 \times n_2$ demultiplexer, $N_2 = r_2 n_2$ output ports on the output side, each output port being an $n_1 \times 1$ multiplexer, and $m_A = r_1 \times r_2$ AWGs on the central stage, where $r_1 = r_2 = r$, $n_1 = N_1/r$, $n_2 = N_2/r$, and $m_A = n_1 n_2$, as shown in FIG. 3;

$KN_2 \times N_2$ AWG network $S_B(K, N_2, K, 1, N_2)$: an AWG network, with K $N_2 \times N_2$ AWGs in the first stage, and $N_2$ K×1 multiplexers in the second stage, as shown in FIG. 4;

$N_1 \times N_2$ interconnection network $\mathcal{N}_2$: $N_1$ left nodes and $N_1$ $N_2 \times 1$ multiplexers on the left side, $N_2$ right nodes and $N_2$ $1 \times N_1$ demultiplexers on the right side, and an $N_1 \times N_2$ AWG on the central stage;

$N_1 \times N_2$ interconnection network $\mathcal{N}_{A1}$: consists of $N_1$ left nodes and $N_1$ $N_2 \times 1$ multiplexers, $N_2$ right nodes and $N_2$ $1 \times N_1$ demultiplexers, and an $N_1 \times N_2$ AWG network $S_A$ on the central stage, as shown in FIG. 3;

$N_1 \times N_2$ interconnection network $\mathcal{N}_{B1}$: consists of $N_1$ left nodes and $N_1$ $N_2 \times 1$ multiplexers; $N_2$ right nodes and $N_2$ $1 \times N_1$ demultiplexers, and an $N_1 \times N_2$ AWG network $S_B$ on the central stage, as shown in FIG. 4;

$N_1 \times N_2$ interconnection network $\mathcal{N}_{A2}$: consists of $N_1$ left nodes and $N_1 n_2 r \times 1$ multiplexers, $N_2$ right nodes and $N_2 n_1 1 \times r$ demultiplexers, and $n_1 n_2$ identical r×r AWGs on the central stage, as shown in FIG. 5;

$N_1 \times N_2$ interconnection network $\mathcal{N}_{B2}$: consists of $N_1$ left nodes and $N_1$ $N_2 \times 1$ multiplexers, $N_2$ right nodes and $KN_2$ $1 \times N_1$ demultiplexers, and K identical $N_2 \times N_2$ AWGs on the central stage, as shown in FIG. 6.

A method of construction of an AWG-based modular interconnection network comprises the following steps:

(1) Remove all the $N_1 N_2$ cables in the $N_1 \times N_2$ interconnection network $\mathcal{N}_1$ as shown in FIG. 1, then provide $N_1$ $N_2 \times 1$ wavelength multiplexers, labeled by $L_0, L_1, \ldots, L_{N_1-1}$ for $N_1$ left nodes, the ith $N_2 \times 1$ wavelength multiplexer having its jth input port connected with the jth port of the ith left node, and the jth port of the ith left node is associated with wavelength $\lambda_{[i+j]_{N_1}}$, where $i=0, 1, \ldots, N_1-1$, and $j=0, 1, \ldots, N_2-1$; provide $N_2$ $1 \times N_1$ wavelength demultiplexers labeled by $R_0, R_1, \ldots, R_{N_2}-1$, for $N_2$ right nodes, the jth $1 \times N_1$ wavelength demultiplexer having its ith output port connected separately with the ith port of the jth right node, and the ith port of the jth right node is associated with wavelength $\lambda_{[i+r]_{N_1}}$. Use $N_1 \times N_2$ AWG to connect $N_1$ $N_2 \times 1$ wavelength multiplexers on the left with $N_2 1 \times N_1$ wavelength demultiplexers on the right. This step transforms the $\mathcal{N}_1$ into an $\mathcal{N}_2$, with all the optical fibers being replaced by an AWG, as shown in FIG. 2, where the ith left node connects with the jth right node through wavelength $\lambda_{[i+j]_{N_1}}$.

As the fabrication of AWGs with very large $N_1$ and $N_2$ is impractical, it is necessary to decompose the AWG into a network of small AWGs: substitute the $N_1 \times N_2$ AWG with an AWG network $S_A(n_1, r_1, m_A, n_2, r_2)$, as shown in FIG. 3. In $S_A$, each input port is a $1 \times n_2$ demultiplexer and the ith input port is labeled by $D_{A1}(\alpha_A, a_A)$, where $\alpha_A = \lfloor i/n_1 \rfloor$ and $a_A = [i]_{n_1}$, and each output port is a $n_1 \times 1$ multiplexer and the jth output port is labeled by $M_{A1}(\beta_A, b_A)$, where $\beta_A = \lfloor j/n_2 \rfloor$, and $b_A = [j]_{n_2}$, and an AWG in the central stage is labeled by $G_{A1}(a_A, b_A)$; the $\alpha_A$th port of $G_{A1}(a_A, b_A)$ is connected with the bath port of $D_{A1}(\alpha_A, a_A)$, the $\beta_A$th port of $G_{A1}(a_A, b_A)$ is connected with the $a_A$th port of $M_{A1}(\beta_A, b_A)$, and $G_{A1}(a_A, b_A)$ is associated with a wavelength subset $\Lambda_{[a_A+b_A]_{n_1}} = \{\lambda_{[a_A+b_A]_{n_1}r+k} | k= 0, 1, \ldots, r-1\}$. This step transforms $\mathcal{N}_2$ to $\mathcal{N}_{A1}$, in which the ith left node connects with the jth right node via wavelength $\lambda_{[a_A+b_A]_{n_1}r+[\alpha_A+\beta_A]_r}$ along the path as follows:

Left Node i→output $b_A$ of $D_{A1}(\alpha_A, a_A)$→input $\alpha_A$ of $G_{A1}(a_A, b_A)$→output $\beta_A$ of $G_{A1}(a_A, b_A)$→input $a_A$ of $M_{A1}(\beta_A, b_A)$→Right Node j.

As shown in FIG. 4, when $N_1 = KN_2$, the three-stage network $S_A$ degenerates into a two-stage network $S_B$ (K, $N_2$, K, 1, $N_2$), where each input port degenerates into a 1×1 demultiplexer, i.e., a fiber link, the dimension of the AWGs in the central stage is $N_2 \times N_2$, and each output port becomes a K×1 multiplexer. The ith input port is labeled by $D_{B1}(\alpha_B, a_B)$, where $\alpha_B = \lfloor i/N_2 \rfloor$, and $a_B = [i]_{N_2}$, the jth output port is labeled by $M_{B1}(\gamma_B)$, where $\gamma_B = j$, and an AWG in the central stage is labeled by $G_{B1}(\alpha_B)$, and further, an AWG in the central stage is associated with a wavelength subset $\Lambda_{\alpha_B} = \{\lambda_{\alpha_B N_2 + k} | k = 0, 1, \ldots, N_2-1\}$; the $a_B$th input port of $G_{B1}(\alpha_B)$ is thus $D_{B1}(\alpha_B,a_B)$, and the $\gamma_B$th output port of $G_{B1}(\alpha_H)$ is connected with the $\alpha_B$th input port of $M_{B1}(\gamma_B)$. This step transforms $\mathcal{N}_2$ into $\mathcal{N}_{B1}$, where the ith left node connects with the jth right node via wavelength $\lambda_{\alpha_B N_2+[\alpha_B+\gamma_B]N_2}$ along the path as follows:

Left Node i→$D_{B1}(\alpha_B,a_B)$→input $a_B$ of $G_{B1}(\alpha_B)$→output $\gamma_B$ of $G_{B1}(\alpha_B)$→input $\alpha_B$ of $M_{B1}(\gamma_B)$→Right Node j.

Wavelengths are precious resources in an optical communication window, and the number of wavelengths required by the system should not increase with the dimension of the interconnection network, and therefore, wavelength reuse must be taken into account. As shown in FIG. 5, substitute the ith $N_2 \times 1$ multiplexer $L_i$ on the left side of $\mathcal{N}_{A1}$ and the $1 \times n_2$ demultiplexer $D_{B1}(\alpha_B,a_B)$ of $S_A$ with $n_2$ r×1 multiplexers, each of which is labeled by $D_{A2}(\alpha_A,a_A,b_A)$, and substitute the jth $1 \times N_1$ demultiplexer $R_j$ on the right side of $\mathcal{N}_{A1}$ and the $n_1 \times 1$ multiplexer $M_{A1}(\beta_A,b_A)$ of $S_A$ with $n_1$ 1×r demultiplexers, each of which is labeled by $M_{A1}(\beta_A,b_A,a_A)$. As the optical transceivers in the left and right nodes can perform wavelength isolation, each r×r AWG can reuse the same wavelength subset $\{\lambda_k|k=0, 1, \ldots, r-1\}$. The r×r AWG in the central stage is labeled by $G_{A2}(a_A,b_A)$. The output port of $D_{A2}(\alpha_A,a_A,b_A)$ is connected with the $\alpha_A$th input port of $G_{A2}(a_A,b_A)$, and the input port of $M_{A2}(\beta_A,b_A,a_A)$ is connected with the $\beta_A$th output port of $G_{A2}(a_A,b_A)$. Accordingly $\mathcal{N}_{A1}$ is transformed into $\mathcal{N}_{A2}$, where the ith left node connects with the jth right node via wavelength $\lambda_{[\lambda\alpha_A+\beta_A]_r}$, along the path as follows:

Left Node i→$D_{A2}(\alpha_A,a_A,b_A)$→input $\alpha_A$ of $G_{A2}(a_A,b_A)$→output $\beta_A$ of $G_{A2}(a_A,b_A)$→$M_{A1}(\beta_A,b_A,a_A)$→Right Node j.

As shown in FIG. 6, if the outcome of step (2) is $\mathcal{N}_{B1}$, substitute the ith $1 \times N_1$ demultiplexer $R_j$ on the right side of $\mathcal{N}_{B1}$ and the jth K×1 multiplexer $M_{B1}(\gamma_B)$ on the output side of $S_B$ with K $N_2 \times 1$ demultiplexers, each of which is labeled by $M_{B2}(\gamma_B,\alpha_B)$. Each $N_2 \times N_2$ AWG in the central stage is labeled by $G_{B2}(\alpha_B)$ and can be associated with the same wavelength subset $\{\lambda_k|k=0, 1, \ldots, N_2-1\}$. The input port is labeled by $D_{B2}(\alpha_B,a_B)$. $D_{B2}(\alpha_B,a_B)$ is connected with the $a_B$th input port of $G_{B2}(\alpha_B)$, and $M_{B2}(\gamma_B,\alpha_B)$ is connected with the $\gamma_B$th output port of $G_{B2}(\alpha_B)$. As a result, $\mathcal{N}_{B1}$ is transformed into $\mathcal{N}_{B2}$, in which the ith left node connects with the jth right node via wavelength $\lambda_{[\alpha_B+\gamma_B]N_2}$ along the path as follows:

Left Node i→$D_{B2}(\alpha_B,a_B)$→input $a_B$ of $G_{B2}(\alpha_B)$→output $\gamma_B$ of $G_{B2}(\alpha_B)$→$M_{B2}(\gamma_B,\alpha_B)$→Right Node j.

(2) If the dimension of the AWG in the central stage is still very large, the method of step (2) can be employed to substitute each AWG in the central stage with a module encapsulated with a three-stage AWG network.

Example 1

Figure 7:
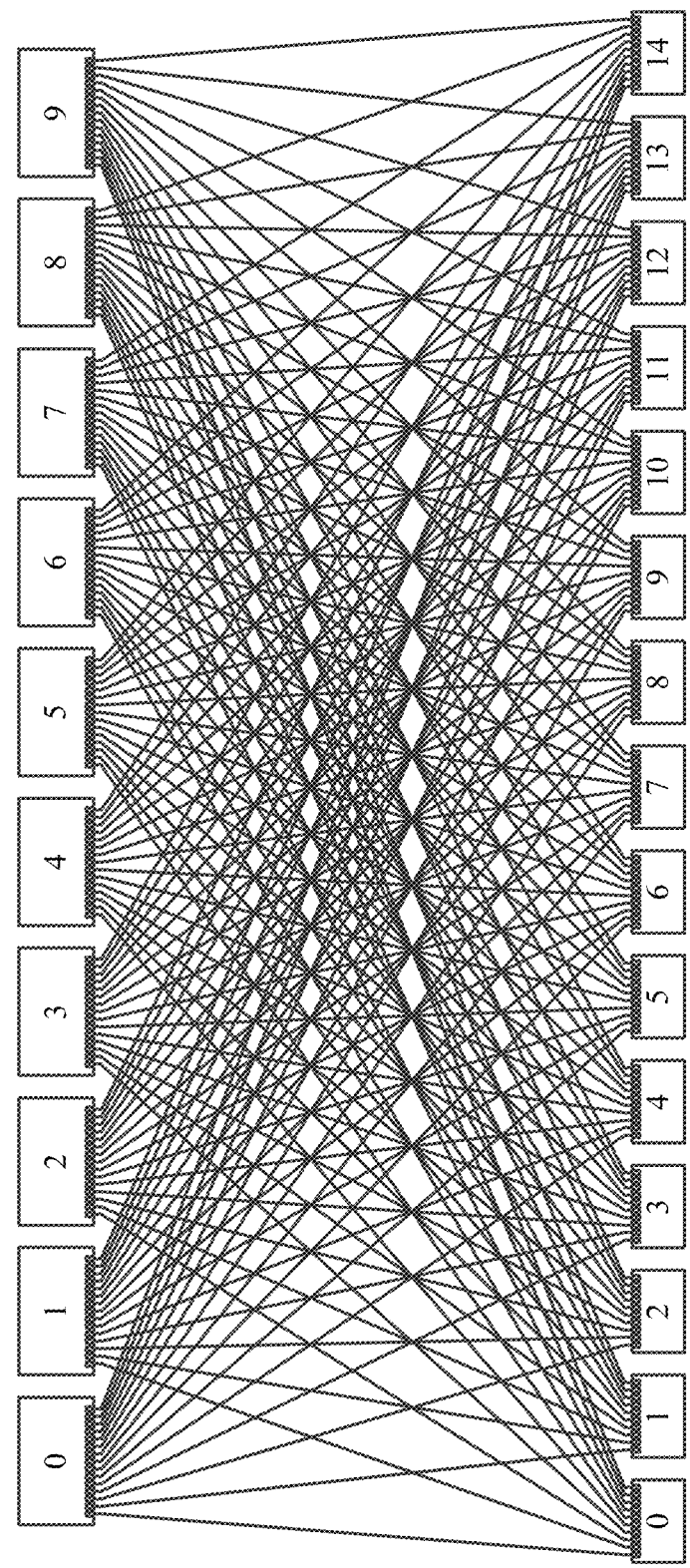
FIG. 7 shows a 15×10 interconnection network $\mathcal{N}_1$ of the present invention.
Figure 8:
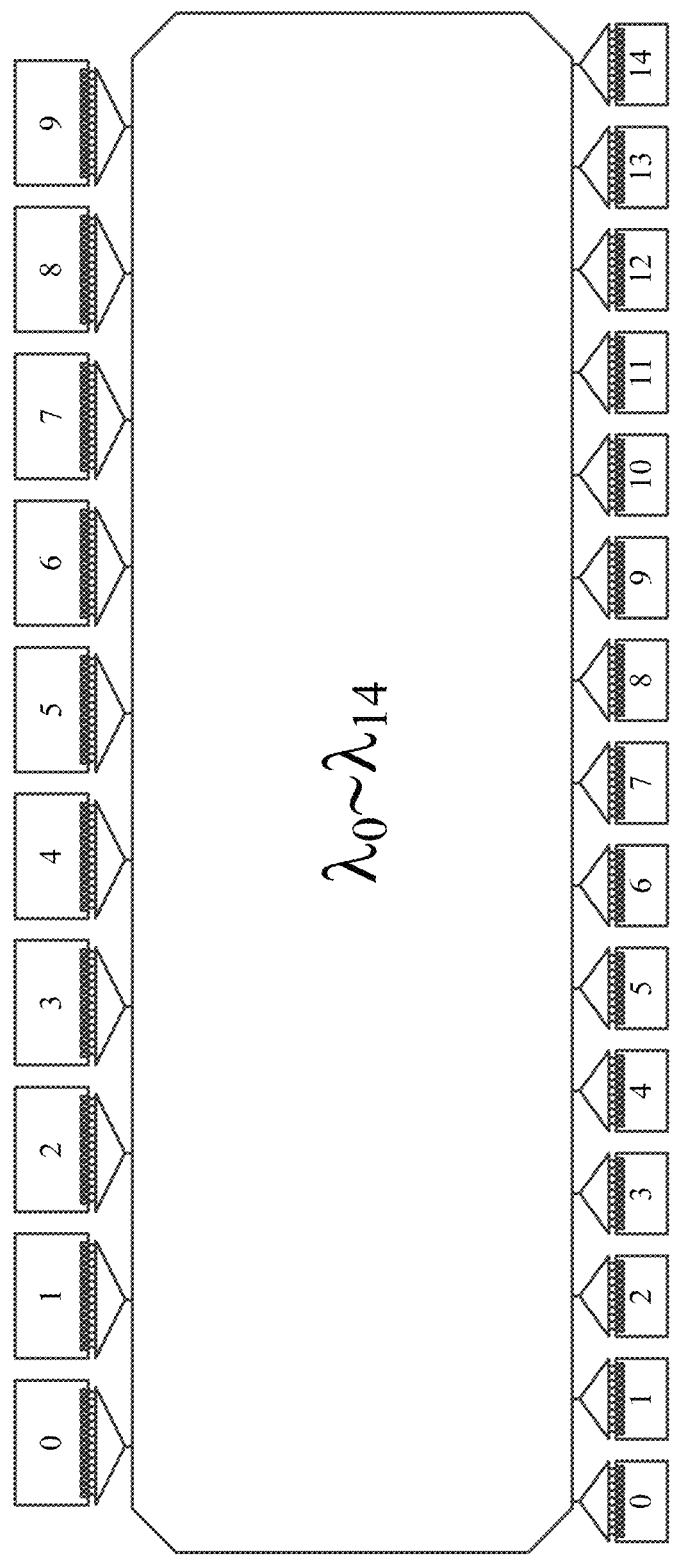
FIG. 8 shows a 15×10 AWG-based interconnection network $\mathcal{N}_2$ of the present invention.
Figure 9:
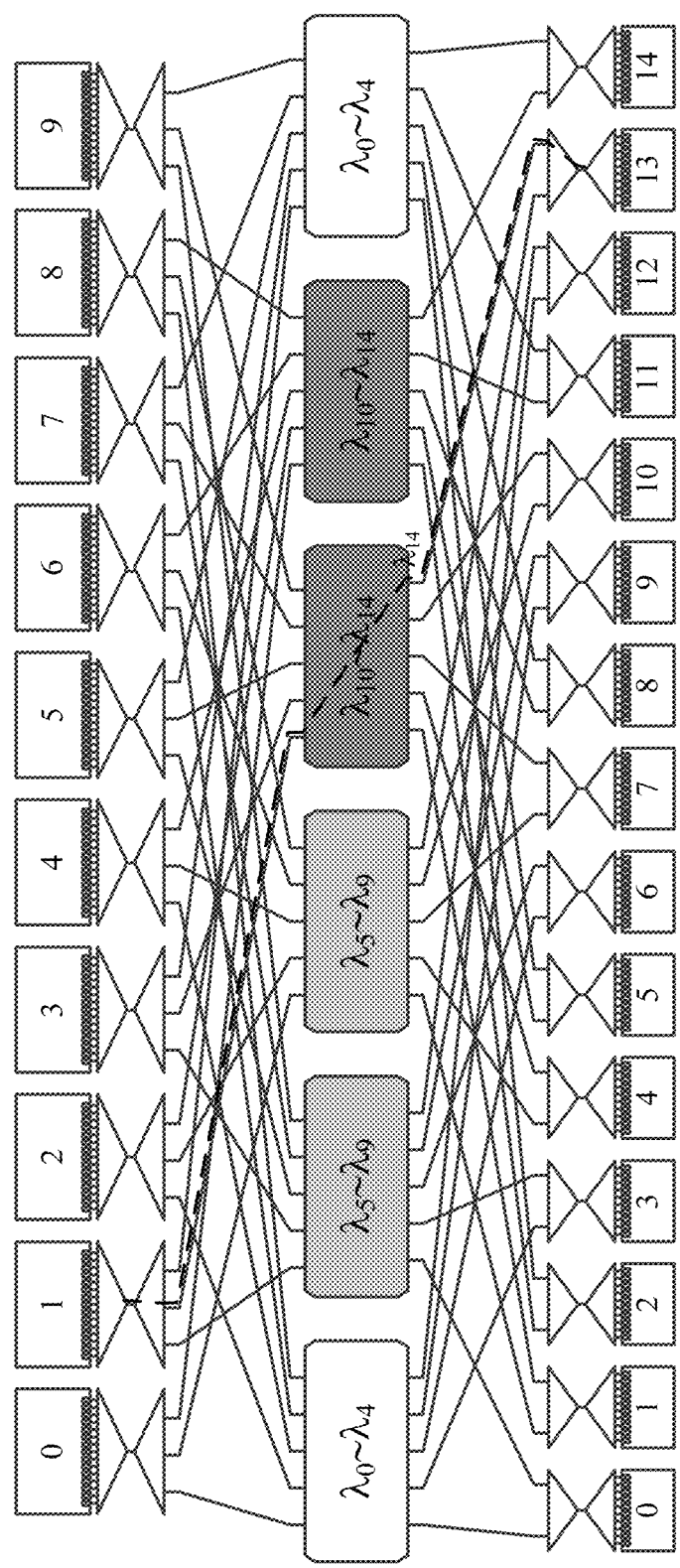
FIG. 9 shows a 15×10 interconnection network $\mathcal{N}_{A1}$ comprising an AWG network $S_A$ of the present invention.
Figure 10:
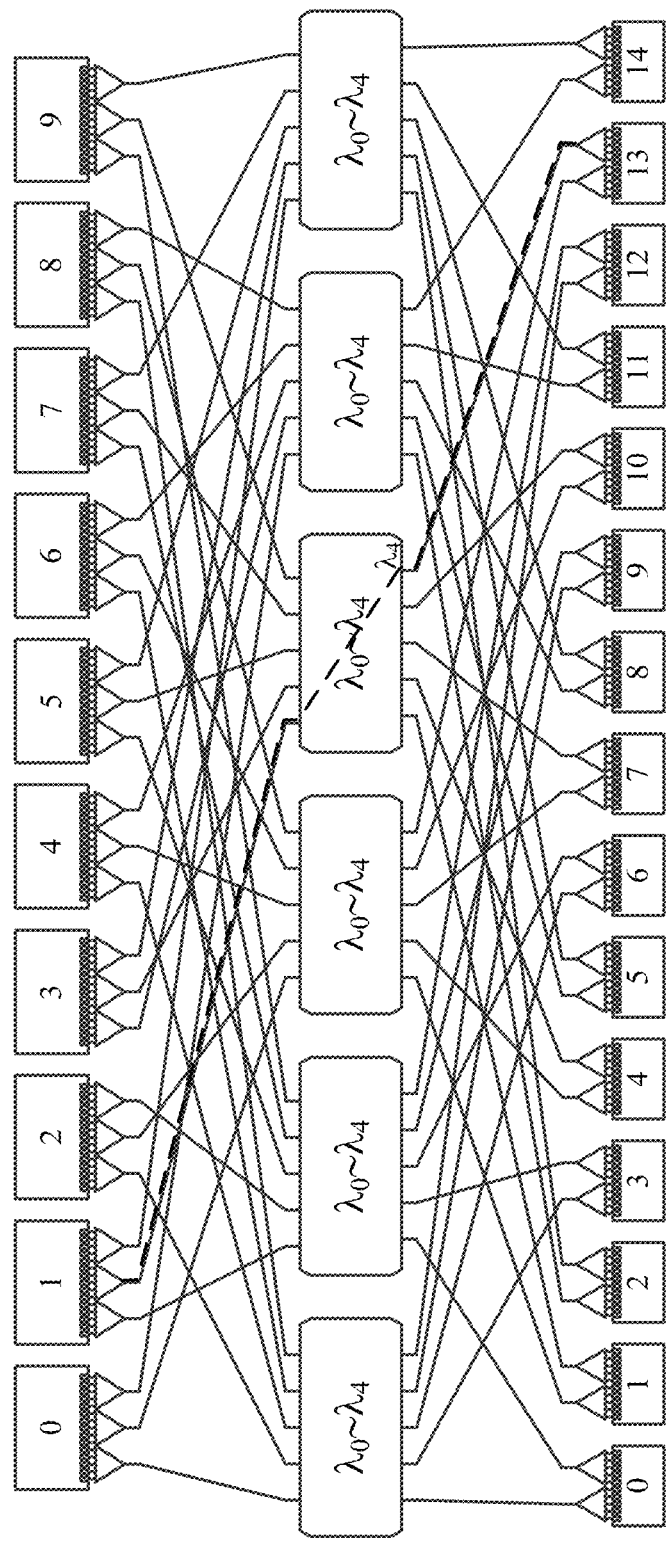
FIG. 10 shows a 15×10 AWG-based modular interconnection network $\mathcal{N}_{A2}$ of the present invention.

A method for constructing an AWG-based modular interconnection network is shown. As for a 15×10 interconnection network $\mathcal{N}_1$, as shown in FIG. 7, where the greatest common divisor of 15 and 10 is 5, the construction method of an AWG-based modular interconnection network comprises the following steps:

1. Substitute the 150 cables on FIG. 7 with a 15×10 AWG, which is associated with $\Lambda=\{\lambda_0, \lambda_1, \ldots, \lambda_{14}\}$. $\mathcal{N}_1$ is thus transformed into $\mathcal{N}_2$. Compared with $\mathcal{N}_1$, $\mathcal{N}_2$ does not need optical fiber links, as shown in FIG. 8;

2. Decompose the 15×10 AWG in $\mathcal{N}_2$ into an AWG network $S_A(3,5,6,2,5)$, which consists of fifteen (15) 1×2 demultiplexers, six (6) 5×5 AWGs, and ten (10) 3×1 multiplexers. Accordingly, the wavelength set $\Lambda=(\lambda_0, \lambda_1, \ldots,$ $\lambda_{14}\}$ is divided to 3 subsets $\Lambda_0=\{\lambda_0, \ldots, \lambda_4\}$, $\Lambda_1=\{\lambda_5, \ldots, \lambda_9\}$, and $\Lambda_2=\{\lambda_{10}, \ldots, \lambda_{14}\}$, which are respectively associated with the six (6) 5×5 AWGs in the central stage. As shown in FIG. 9, this step transforms $\mathcal{N}_2$ into $\mathcal{N}_{A1}$. Compared with the 150 optical fiber links of $\mathcal{N}_1$, $\mathcal{N}_{A1}$ needs only 60 optical fiber links. The reduction ratio of the number of required optical fiber links in this example is 2.5;

3. Substitute a 1×2 demultiplexer of $S_A$ and a 10×1 multiplexer on the left side of $\mathcal{N}_2$ with two (2) 5×1 AWGs, and substitute a 3×1 multiplexer of $S_A$ and the 1×15 demultiplexer on the right side of $\mathcal{N}_2$ with three (3) 1×5 AWG Wavelength dependence among the 6 5×5 AWGs is eliminated due to the transceivers equipped on both sides of $\mathcal{N}_2$. Thus, these AWGs can be associated with the same wavelength subset $\Lambda_0$, which indicates that the wavelength reuse property is achieved. As shown in FIG. 10, an AWG-based modular interconnection network $\mathcal{N}_2$ is obtained. The number of required optical fibers in $\mathcal{N}_{A2}$ is 60. After the construction of an AWG-based modular interconnection network, the number of optical fiber links is reduced from 150 to 60, and the reduction of the number of optical fiber links remarkably cuts down the network complexity and thus simplifies system maintenance. In general, the number of optical fiber links is reduced r/2 times. In practical applications, $N_1$ and $N_2$ might be very large, which results in that the dimension of the AWGs in the central stage is still large. In this case, the method in step (2) can be employed to substitute each AWG in the central stage with a module that consists of a three-stage network of small AWGs.

Example 2

Figure 11:
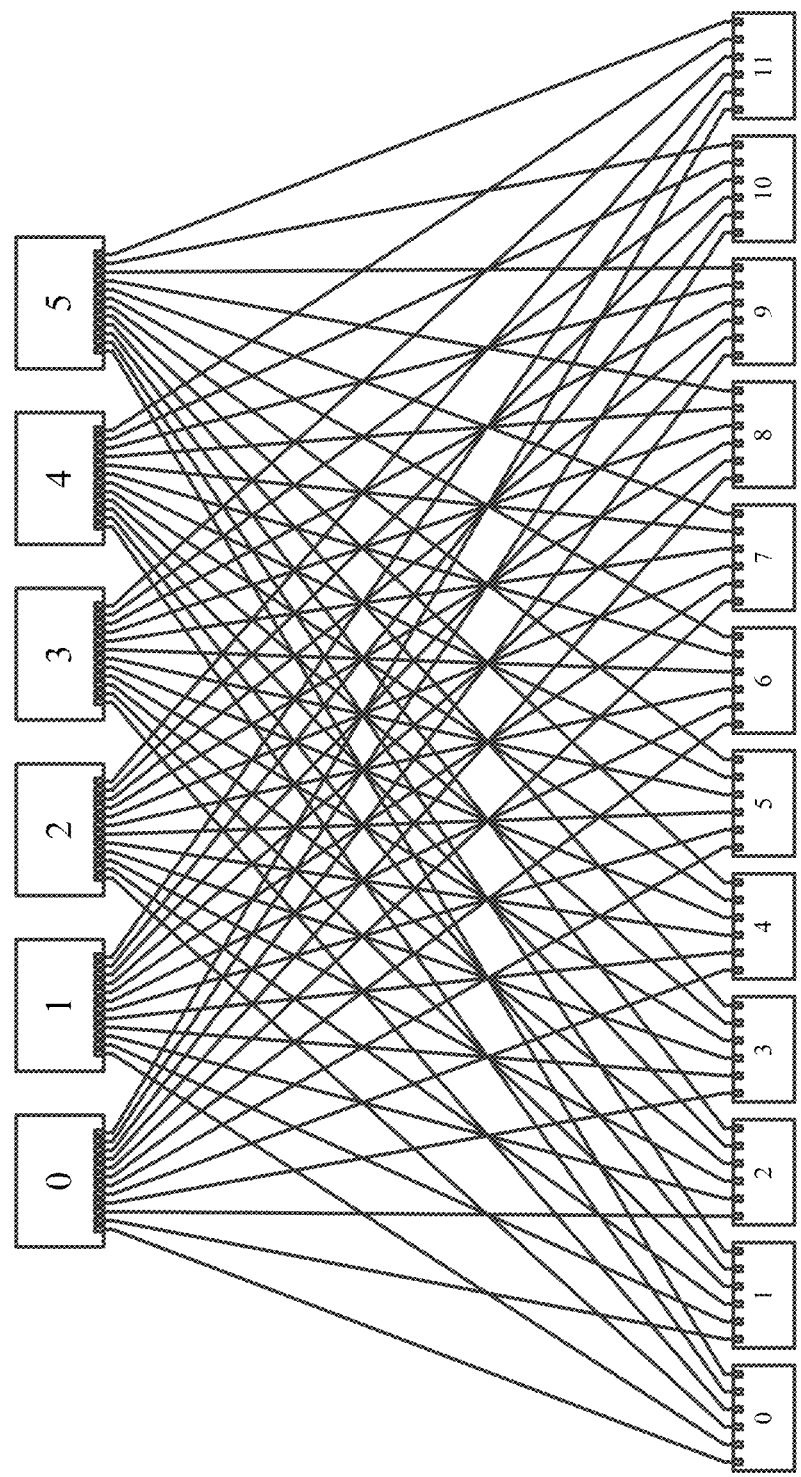
FIG. 11 shows a 12×6 interconnection network $\mathcal{N}_1$ of the present invention.
Figure 12:
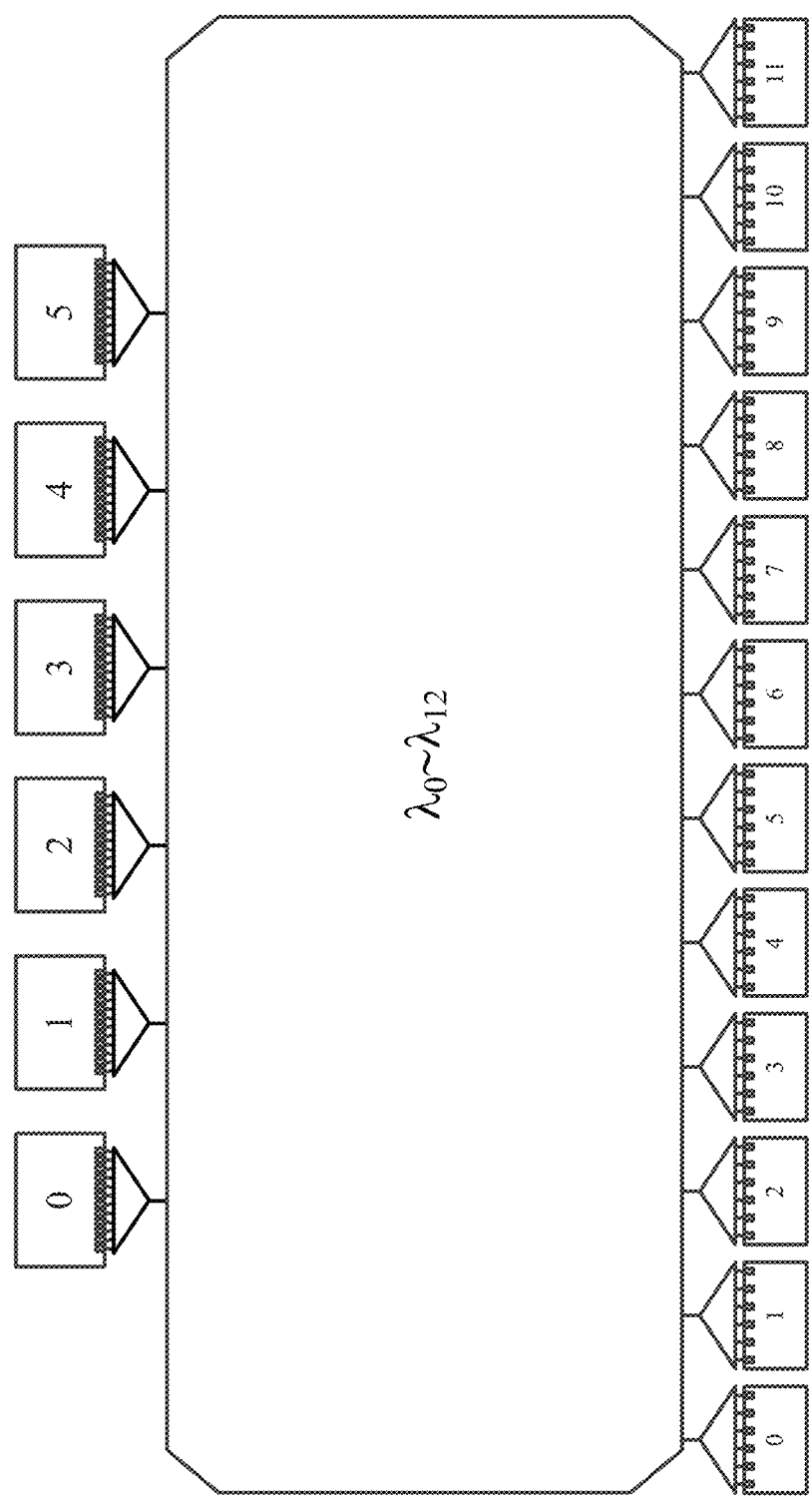
FIG. 12 shows a 12×6 AWG-based interconnection network $\mathcal{N}_2$ of the present invention.

A method for constructing an AWG-based modular interconnection network, as for a 12×6 interconnection network $\mathcal{N}_1$ as shown in FIG. 11, where 12 is a multiple of 6, the construction comprises the following steps:

1. Substitute the 72 linking cables in the middle of FIG. 11 with a 12×6 AWG, which is associated with $\Lambda=\{\lambda_0, \lambda_1, \ldots, \lambda_{11}\}$. This operation transforms $\mathcal{N}_1$ to $\mathcal{N}_2$. Compared with $\mathcal{N}_1$, $\mathcal{N}_2$ does not need optical fiber links, as shown in FIG. 12.

Figure 13:
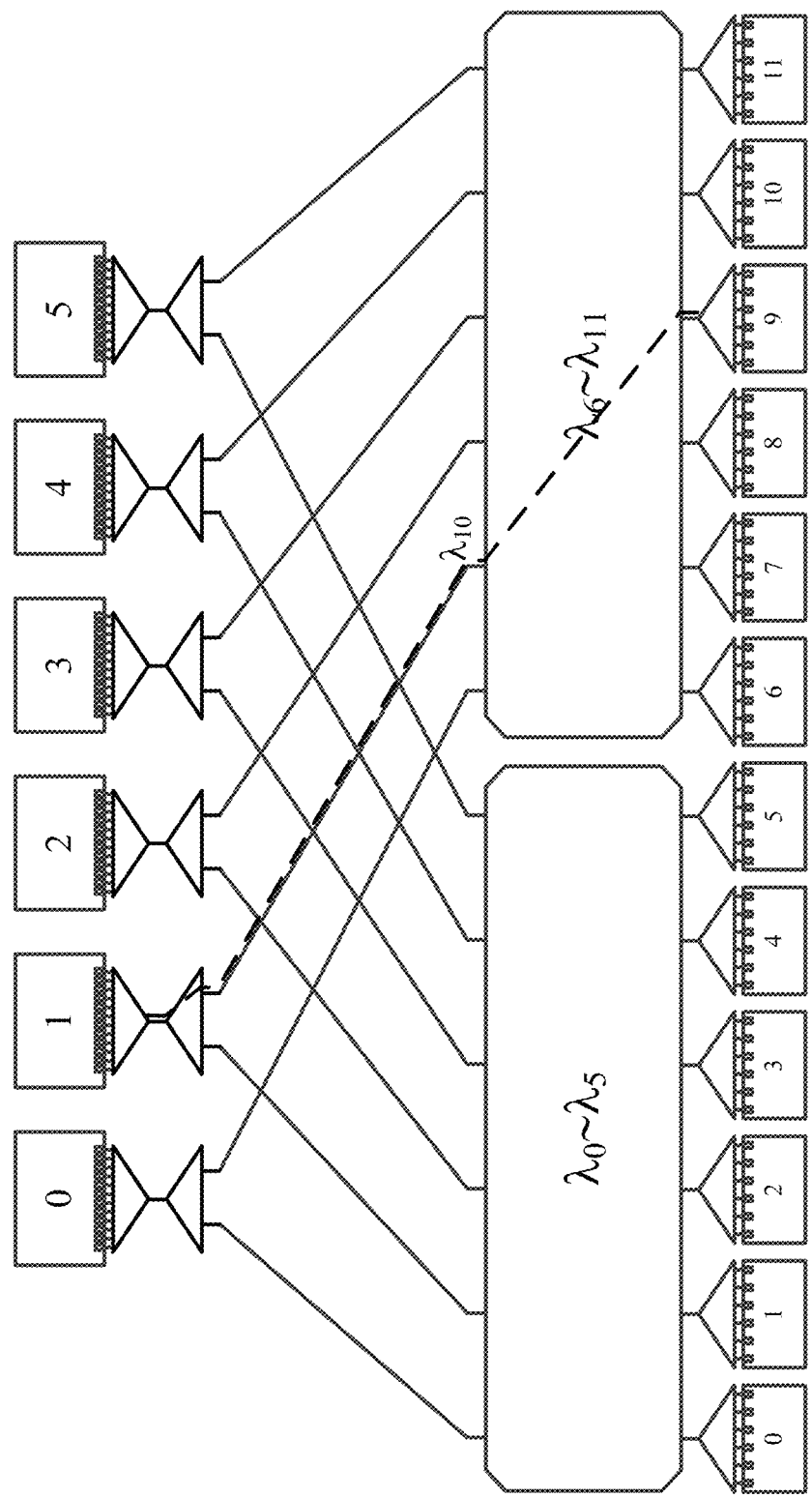
FIG. 13 shows a 12×6 AWG-based interconnection network $\mathcal{N}_{B1}$ comprising a two-stage AWG network $S_B$ of the present invention.

2. Decompose the 12×6 AWG in $N_2$ into an AWG network $S_B(2,6,2,1,6)$ that consists of six (6) 1×2 multiplexers, two (2) 6×6 AWGs. Accordingly, $\Lambda=\{\lambda_0, \lambda_1, \ldots, \lambda_{14}\}$ is divided into 2 subsets $\Lambda_0=\{\lambda_0, \ldots, \lambda_5\}$ and $\Lambda_1=\{\lambda_6, \ldots, \lambda_{11}\}$, which are respectively associated with the two (2) 6×6 AWGs in the central stage. As shown in FIG. 13, this step transforms into $\mathcal{N}_2$ Compared with the optical fiber links of $\mathcal{N}_1$, $\mathcal{N}_{B1}$ needs only 12 optical fiber links. The reduction ratio of the number of optical fiber links in this example is 6.

Figure 14:
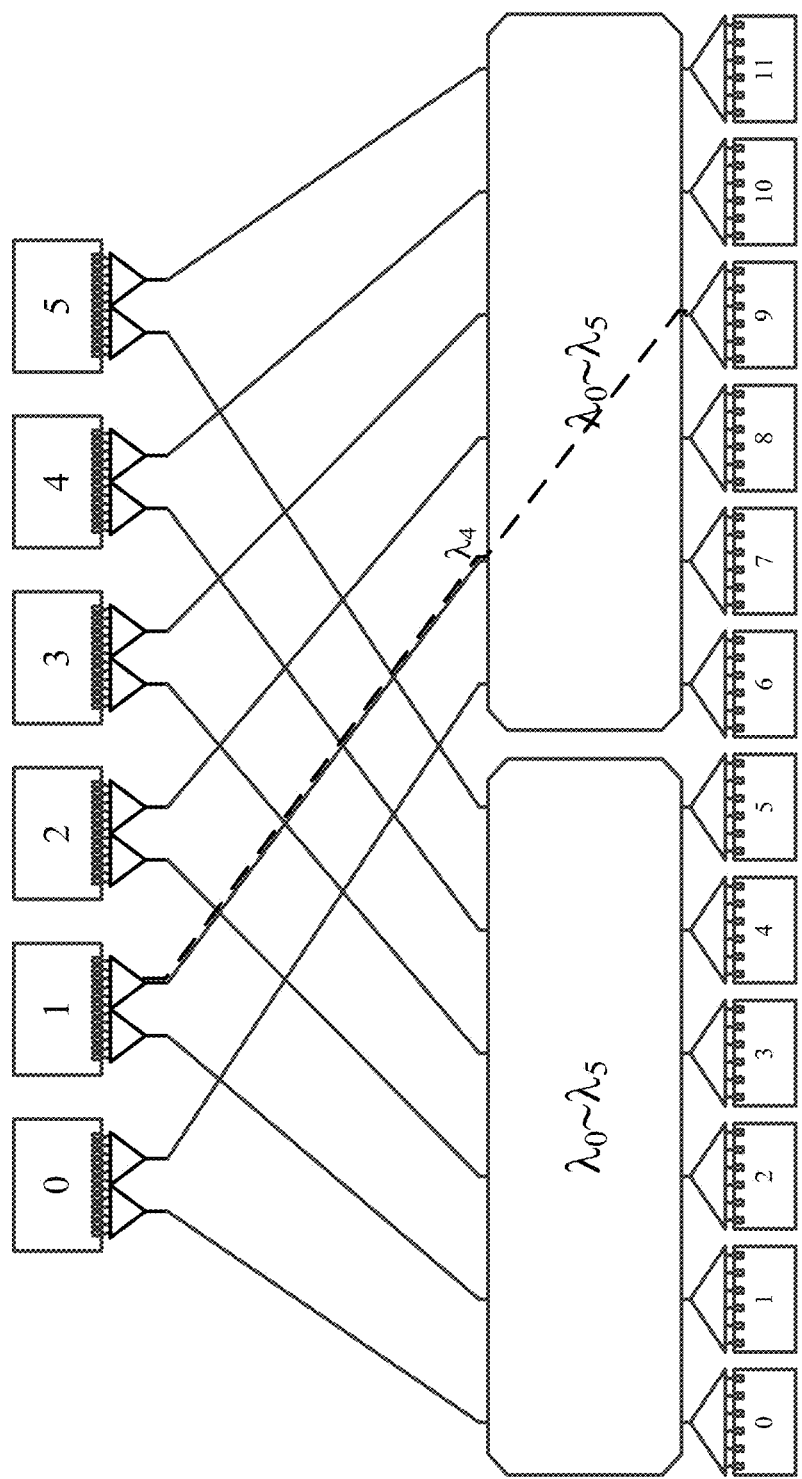
FIG. 14 shows a 12×6 AWG-based modular interconnection network $\mathcal{N}_{B2}$ of the present invention.

3. Substitute a 2×1 multiplexer of $S_B$ and a 1×12 demultiplexer on the right side of $\mathcal{N}_2$ with two (2) 1×6 AWGs. Wavelength dependence between the two (2) 6×6 AWGs is eliminated due to the transceivers provided on both sides of $\mathcal{N}_2$. Thus, these AWGs can be associated with the same wavelength subset $\Lambda_0$, which indicates that the wavelength reuse property is achieved. As shown in FIG. 14, an AWG-based modular interconnection network $\mathcal{N}_{B2}$ is obtained. The number of required optical fibers in $\mathcal{N}_{B2}$ is 12. In practical applications, $N_1$ and $N_2$ might become very large, resulting in large AWGs in the central stage. In such a case, the method in step (2) can be employed to substitute the AWG in the central stage with a module that consists of a three-stage network of small AWGs. This is the idea of modulization of the present invention. After the construction of an AWG-based modular interconnection network, the number of optical fiber links is reduced from 72 to 12, a 6 time reduction. General speaking, when $N_1$ is a multiple of $N_2$, the number of optical fiber links can be reduced from $N_1N_2$ to $N_1$, by employing the method. The reduction of the number of optical fiber links cuts down the network complexity and thus simplifies network maintenance.

We claim:

1. A method for constructing an interconnection network, comprising:

providing $N_1$ $N_2 \times 1$ wavelength multiplexers, labeled by $L_0, L_1, \ldots, L_{N_1-1}$, for $N_1$ left nodes, an ith $N_2 \times 1$ wavelength multiplexer having its jth input port connected with a jth port of an ith left node, and a jth port of the ith left node is associated with a wavelength $$\lambda_{[i+jN_1]},$$

wherein $i=0, 1, \ldots, N_1-1, j=0, 1, \ldots, N_2-1$;

providing $N_2$ $1 \times N_1$ wavelength demultiplexers labeled by $R_0, R_1, \ldots, R_{N_2-1}$, for $N_2$ right nodes, a jth $1 \times N_1$ wavelength demultiplexer having its ith output port connected separately with an ith port of a jth right node, and an ith port of a jth right node is associated with wavelength $$\lambda_{[i+jN_1]};$$

interconnecting the $N_1$ wavelength multiplexers on the left with the $N_2$ wavelength demultiplexers on the right via the $N_1 \times N_2$ AWG, the $N_1 \times N_2$ AWG having the $N_1$ input ports and the $N_2$ output ports, and being associated with the wavelength set $\Lambda=\{\lambda_0, \lambda_1, \ldots, \lambda_{N_1-1}\}$;

decomposing the $N_1 \times N_2$ AWG to a three-stage AWG network $S_A(n_1, r_1, m_A, n_2, r_2)$, wherein the AWG network $S_A$ comprises $N_1=r_1n_1$ input ports on an input side, with each input port being a $1 \times n_2$ wavelength demultiplexer, and $N_2=r_2n_2$ output ports on an output side, with each output port being an $n_1 \times 1$ wavelength multiplexer, $m_A$ $r_1 \times r_2$ AWGs in the central stage, wherein $r_1=r_2=r$, $n_1=N_1/r$, $n_2=N_2/r$, and $m_A=n_1n_2$;

an ith input port is labeled by $D_{A1}(\alpha_A, a_A)$, wherein $\alpha_A=\lfloor i/n_1 \rfloor$ and $a_A=[i]_{n_2}$, and a jth output port is labeled by $M_{A1}(\beta_A, b_A)$, wherein $\beta_A=\lfloor j/n_2 \rfloor$ and $b_A=[j]_{n_2}$, and each of the AWGs in the central stage is labeled by $G_{A1}(\alpha_A, b_A)$; the $\alpha_A$th input port of $G_{A1}(\alpha_A, b_A)$ is connected with the $b_A$th output port of $D_{A1}(\alpha_A, a_A)$, the $\beta_A$th output port of $G_{A1}(\alpha_A, b_A)$ is connected with the $\alpha_A$th input port of $M_{A1}(\beta_A, b_A)$, and $G_{A1}(\alpha_A, b_A)$ is associated with a wavelength subset $$\Lambda_{[a_A+b_A]_{n_1}} = \{\lambda_{[a_A+b_A]_{n_1} \cdot r+k} \mid k = 0, 1, \ldots, r-1\};$$

replacing the ith $N_2 \times 1$ wavelength multiplexer $L_i$ and the $1 \times n_2$ wavelength demultiplexer $D_{A1}(\alpha_A, a_A)$ with $n_2$ $r \times 1$ wavelength multiplexers, each of the $r \times 1$ wavelength multiplexers is labeled by $D_{A2}(\alpha_A, a_A, b_A)$;

replacing the jth $1 \times N_1$ wavelength demultiplexer $R_j$ and the $n_1 \times 1$ wavelength multiplexer $M_{A1}(\beta_A, b_A)$ with $n_1$ $r \times 1$ wavelength demultiplexers, each of the $r \times 1$ wavelength demultiplexers being labeled by $M_{A2}(\beta_A, b_A, \alpha_A)$; and associating each $r_1 \times r_2$ AWG, labeled by $G_{A2}(\alpha_A, b_A)$, with a wavelength subset $\{\lambda_k \mid k=0, 1, \ldots, r-1\}$;

wherein the output port of $D_{A2}(\alpha_A, a_A, b_A)$ is connected with the $\alpha_A$th input port of $G_{A2}(\alpha_A, b_A)$, and the input port of $M_{A2}(\beta_A, b_A, \alpha_A)$ is connected with the $\beta_A$th output port of $G_{A2}(\alpha_A, b_A)$.

2. An AWG-based modular interconnection network according to claim 1, comprising:

left nodes, a number of the left nodes being $N_1$, and each of the left nodes having $N_2$ ports, right nodes, a number of the right nodes being $N_2$, and each of the right nodes having $N_1$ ports, an optical transceiver associated with a fixed wavelength on each port of the left and right nodes, $r \times 1$ wavelength multiplexers, a number of the $r \times 1$ wavelength multiplexers being $N_1n_2$, each of the $n_2$ $r \times 1$ wavelength multiplexers having $N_2$ input ports being connected with the $N_2$ ports of one of the left nodes, and $n_2=N_2/r$, $1 \times r$ wavelength demultiplexers, a number of the $1 \times r$ wavelength demultiplexers being $N_2n_1$, each of the $n_1$ $1 \times r$ wavelength demultiplexers having $N_1$ output ports being connected with the $N_1$ ports of one of the right nodes, and $n_1=N_1/r$, and $r \times r$ AWGs connecting the $r \times 1$ wavelength multiplexers and the $1 \times r$ wavelength demultiplexer, a number of the $r \times r$ AWGs being $n_1n_2$, each of the $r \times r$ AWGs being associated with a wavelength subset $\{\lambda_k \mid k=0, 1, \ldots, r-1\}$, where $N_1 \geq N_2$, $N_1$ and $N_2$ are integers that have a greatest common divisor r, and $r>1$.

3. The method as claimed in claim 1, further comprising:
replacing the AWG in the central stage with a module constituted of a network AWG of three stages.

4. A method for constructing an interconnection network, comprising:

providing $N_1$ $N_2 \times 1$ wavelength multiplexers, labeled by $L_0, L_1, \ldots, L_{N_1-1}$, for $N_1$ left nodes, an ith $N_2 \times 1$ wavelength multiplexer having its ith input port connected with a jth port of an ith left node, and a jth port of the ith left node is associated with a wavelength $$\lambda_{[i+jN_1]},$$

wherein $i=0, 1, \ldots, N_1-1, j=0, 1, \ldots, N_2-1$, and $N_1=KN_2$;

providing $N_2$ $1 \times N_1$ wavelength demultiplexers labeled by $R_0, R_1, \ldots, R_{N_2-1}$, for $N_2$ right nodes, a jth $1 \times N_1$ wavelength demultiplexer having its ith output port connected separately with an ith port of a jth right node, and an ith port of a jth right node is associated with wavelength $$\lambda_{[i+jN_1]};$$

interconnecting the $N_1$ wavelength multiplexers on the left with the $N_2$ wavelength demultiplexers on the right via the $N_1 \times N_2$ AWG, the $N_1 \times N_2$ AWG having the $N_1$ input ports and the $N_2$ output ports, and being associated with the wavelength set $\Lambda=\{\lambda_0, \lambda_1, \ldots, \lambda_{N_1-1}\}$;

decomposing the $N_1 \times N_2$ AWG to a two-stage network $S_B(K, N_2, K, 1, N_2)$, wherein each input port of the AWG network $S_B$ is a link, there are K $N_2 \times N_2$ AWGs in the central stage, and each output port is a K×1 wavelength multiplexer; the ith input port is labeled by $D_{B1}(\alpha_B, a_B)$, wherein $\alpha_B = \lfloor i/N_2 \rfloor$ and $a_B = [i]_{N_2}$, the jth output port is labeled by $M_{B1}(\gamma_B)$, wherein $\gamma_B = j$, and each AWG in the central stage is labeled by $G_{B1}(\alpha_B)$, and the AWG in the central stage is associated with a wavelength subset $\Lambda_{\alpha_B} = \{\lambda_{\alpha_B N_2 + k} | k=0, 1, \ldots, N_2-1\}$;

the $\alpha_B$th input port of $G_{B1}(\alpha_B)$ is thus $D_{B1}(\alpha_B, a_B)$, the $\gamma_B$th output port of $G_{B1}(\alpha_B)$ is connected with the $\alpha_B$th input port of $M_{B1}(\gamma_B)$;

denoting each of the $N_1 \times 1$ wavelength multiplexers as $D_{B2}(\alpha_1, a_B)$;

replacing the jth $1 \times N_1$ demultiplexer $R_j$ and the K×1 multiplexer $M_{B1}(\gamma_B)$ with K $N_2 \times 1$ wavelength multiplexers, each of the $N_2 \times 1$ wavelength multiplexers being labeled by $M_{B2}(\gamma_B, \alpha_B)$; and associating each $N_2 \times N_2$ AWG, labeled by $G_{B2}(\alpha_B)$, with a wavelength subset $\{\lambda_k | k=0, 1, \ldots, N_2-1\}$;

wherein $D_2(a_B, a_B)$ is connected with the $\alpha_B$th input port of $G_{B2}(\alpha_B)$, and $M_{B2}(\gamma_B, \alpha_B)$ is connected with the $\gamma_B$th output port of $G_{B2}(\alpha_B)$.

5. An AWG-based modular interconnection network according to claim 4, comprising:
left nodes, a number of the left nodes being $N_1$, and each of the left nodes having $N_2$ ports,
right nodes, a number of the right nodes being $N_2$, and each of the right nodes having $N_1$ ports,
an optical transceiver associated with a fixed wavelength on each port of the left or right node,
$N_2 \times 1$ wavelength multiplexers, a number of the $N_2 \times 1$ wavelength multiplexers being $N_1$, and each of the $N_2 \times 1$ wavelength multiplexers having $N_2$ input ports being connected with the $N_2$ ports of one of the left nodes;
$1 \times N_2$ wavelength demultiplexers, a number of the $1 \times N_2$ wavelength demultiplexers being $N_1 = KN_2$, and each of the K $1 \times N_2$ wavelength demultiplexers having $N_1$ output ports being connected with the $N_1$ ports of one of the right nodes; and
$N_2 \times N_2$ AWGs connecting the $N_2 \times 1$ wavelength multiplexers and the $1 \times N_2$ wavelength demultiplexers, a number of the $N_2 \times N_2$ AWGs being K, and each of the $N_2 \times N_2$ AWGs being associated with a wavelength subset $\{\lambda_i | i=0, 1, \ldots, N_2-1\}$,
wherein $N_1 = KN_2$.

6. The method as claimed in claim 4, further comprising:
replacing the AWG in the central stage with a module constituted of a three-stage network of AWGs.

\* \* \* \* \*